United States Patent [19]

Werp

[11] Patent Number: 5,132,693
[45] Date of Patent: Jul. 21, 1992

[54] RADAR APPARATUS

[75] Inventor: Richard E. Werp, Madison, Ala.

[73] Assignee: The Boeing Company, Seattle, Wash.

[21] Appl. No.: 531,323

[22] Filed: May 31, 1990

[51] Int. Cl.$^5$ .................... G01S 13/89; H01Q 1/28
[52] U.S. Cl. .................... 342/179; 342/25; 343/705
[58] Field of Search .............. 342/179.25; 343/705

[56] References Cited

U.S. PATENT DOCUMENTS

| | | | |
|---|---|---|---|
| 3,284,799 | 11/1966 | Ross | 342/54 |
| 3,388,396 | 6/1968 | Rope et al. | 342/179 |
| 3,400,363 | 9/1968 | Silverman | 367/8 |
| 3,490,021 | 1/1970 | Hogg et al. | 342/179 |
| 3,685,051 | 8/1972 | Wells | 342/179 |
| 3,717,843 | 2/1973 | Farrah et al. | 367/8 |
| 3,719,922 | 3/1973 | Lopes, Jr. et al. | 367/11 |
| 3,757,332 | 9/1973 | Tricoles | 342/179 |
| 3,787,863 | 1/1974 | Watanabe et al. | 342/424 |
| 3,852,745 | 12/1974 | Lebail | 342/179 |
| 3,887,923 | 6/1975 | Hendrix | 342/424 |
| 3,909,827 | 9/1975 | Tricoles et al. | 342/179 |
| 4,180,814 | 12/1979 | Barton | 342/196 |
| 4,271,413 | 6/1981 | Shreve | 342/368 |
| 4,330,876 | 5/1982 | Johnson | 367/105 |
| 4,336,543 | 6/1982 | Ganz et al. | 343/705 |
| 4,385,301 | 5/1983 | Tricoles et al. | 342/445 |
| 4,449,192 | 5/1984 | Watanabe et al. | 364/559 |
| 4,546,355 | 10/1985 | Boles | 342/174 |
| 4,675,677 | 6/1987 | von Maydell et al. | 342/25 |
| 4,929,951 | 5/1990 | Small | 342/179 |

Primary Examiner—Gilberto Barrón, Jr.
Attorney, Agent, or Firm—Finnegan, Henderson, Farabow, Garrett & Dunner

[57] ABSTRACT

An imaging radar system for an aircraft includes four transmit antennas, connected to a central transmitter, and four receive antenna arrays for respectively receiving reflections of signals transmitted by the transmit antennas. A receiver circuit, associated with each antenna element of each receive antenna array, heterodynes the received signal to yield a resultant signal and combines the resultant signal with a reference signal to yield an interference grating signal. The grating signal of each receiver circuit is digitized and provided to a central processing unit that performs a spatial Fourier transform on the grating signals to determine angles of reflecting objects relative to each receive array.

22 Claims, 6 Drawing Sheets

RADAR APPARATUS

The present invention is directed in general to radar systems and, more particularly, to imaging radar systems for installation in aircraft.

BACKGROUND OF THE INVENTION

The design of aircraft to carry radar equipment suitable for carrying out an airborne early warning (AEW) mission poses significant problems. One requirement for such a mission is provision of 360° azimuthal radar coverage. This creates the need to install, in the aircraft, radar antenna arrays having substantial physical space requirements. One solution to this problem is to mount additional structures on a standard aircraft to accommodate the required radar equipment. The well-known addition of an external rotodome onto an aircraft is an exemplary implementation of such a solution. Use of a dorsal fin mounted on an aircraft to house antenna arrays is another known example of such a solution. The addition of such structures typically requires structural modification to the aircraft to accommodate the additional structure.

One obvious adverse affect of such additional structures is that the aircraft suffers aerodynamic drag penalties. As a result, the overall performance of the aircraft is limited. The drag penalties also serve to limit the flying range of the aircraft. This result is contrary to the AEW mission of the aircraft since it is desirable for the aircraft to travel significant distances from its base of operation and/or remain airborne for extended periods in order to scan over a large area. A further adverse effect of additional structures is that the aircraft becomes mission dedicated. That is, the aircraft serves no useful function other than to fly the AEW mission.

A second solution to the problem of accommodating the radar equipment required for an AEW mission is to conformally mount antenna arrays within the aircraft's structure. An example of this solution is disclosed in U.S. Pat. No. 4,336,543 to Ganz et al. In that patent, an array of Yagi end fire antenna elements are conformally mounted along the leading edge of each main wing, along the trailing edge of the tail wing, and in the sides of the aircraft fuselage to provide side-looking antenna coverage. As a result, the aircraft provides 360° of azimuthal coverage. The antenna elements are implemented as a phased array for both transmitting and receiving signals.

With respect to conformally mounted antenna systems such as disclosed in the above noted patent, each antenna element is used both for transmitting and receiving. The instant inventor notes that in view of the substantial amount of transmission power that must be delivered to each antenna element, large conductor electrical cables would have to be routed to the individual antenna elements at all locations. Such heavy cabling represents a substantial weight penalty and further requires allocation of substantial physical space. Further, the use of the individual antenna elements for transmission causes each element to generate significant amounts of heat. This can result in the need for cooling of the antenna elements, e.g., via forced convection. As in the case of the large conductor cabling, provision of cooling equipment represents weight and space allocation problems. Such weight and space problems have a direct impact on aircraft structure and will likely require redesigning of the structure to accommodate the radar antenna arrays and their associated cabling and cooling equipment. The result is an aircraft structural design that is mission dedicated.

With the antenna arrays conformally mounted, either a centrally located single transmitter or a distributed transmitter system can be provided. In the case of the centrally located transmitter, distributor apparatus of a type know in the art is required to divide the transmitted signal and distribute it among the multiple antenna elements. Such distributor apparatus is typically heavy, requires allocation of physical mounting space and therefore adversely impacts the structural design of the aircraft. In a distributed transmitter system, a separate transmitter element is located proximate either each transmitting antenna or group of transmitting antennas. In the case of the conformally mounted antenna array including wing mounted antenna elements, this requires mounting individual transmitters within the wing structure. Further, the individual transmitters typically require connection to a liquid cooling system. As a result, the aircraft structural design must be modified to accommodate the transmitters and their associated cabling and liquid cooling piping. This in turn results in the aircraft structural design becoming mission dedicated. A major disadvantage of a mission dedicated structural design is that the cost of the aircraft design can only be allocated over the limited number of aircraft that are manufactured to perform the particular mission. This results in a substantial cost to be recovered from the sale of each aircraft.

SUMMARY OF THE INVENTION

It is an object of the present invention to provide an imaging radar system, for installation in an aircraft, that is not subject to the aforementioned problems and disadvantages.

It is another object of the present invention to provide an imaging radar system, for installation in an aircraft, that does not require structural modification to the aircraft to accommodate the radar equipment required for an AEW mission.

It is a further object of the present invention to provide a radar system, for installation in an aircraft, that does not require the design of a mission dedicated aircraft to accommodate the radar equipment for an AEW mission.

To achieve the objects and in accordance with the purpose of the present invention, as embodied and described herein, there is provided an imaging radar system comprising a transmitter for generating a microwave transmission signal; a transmit antenna, operatively coupled to the transmitter, for transmitting the transmission signal in a predetermined direction; a plurality of receive antennas mounted to form a receive antenna array for receiving signals that are reflections of the transmission signal; a plurality of receiver means, each coupled to a corresponding one of the plurality of receive antennas, for respectively preparing the signals received by the receive antennas for processing; means for generating a reference signal; each receiver means including means for combining the received signal with the reference signal and providing an interference grating signal corresponding to the received signal; and processing means, operatively coupled to receive the interference grating signals respectively corresponding to the received signals received by the plurality of receive antennas, for performing a spatial Fourier transform of the interference grating signals, a result of the spatial Fourier transform being a detection pattern that locates transmission signal reflecting objects relative to the receive antenna array.

The present invention is further directed to a method for imaging radar transmission signal reflecting objects, comprising the steps of: transmitting a signal in a predetermined direction; receiving as receive signals reflections of the transmission signals at each of a plurality of receive antennas of a receive antenna array; combining, for each receive antenna, the received signal with a reference signal for providing an interference grating signal corresponding to the received signal; performing a spatial Fourier transform on the interference grating signals respectively corresponding to the received signals; and obtaining, as results of the spatial Fourier transform, information about positions of transmission signal reflecting objects relative to the receive antenna array.

The accompanying drawings which are incorporated in and constitute a part of this specification, illustrate embodiments of the invention and, together with the description, serve to explain the principles of the invention.

DESCRIPTION OF THE PREFERRED EMBODIMENT

The illustrated embodiment of the present invention described hereinbelow is directed to an imaging radar system, for mounting in an aircraft, that is primarily intended for use as a moving target radar. The radar system is configured to provide 360° of azimuthal coverage relative to the aircraft and is intended for use in fulfilling an AEW mission. A feature of the illustrated embodiment is that the antenna elements used for transmitting signals are separate from the antenna elements used for receiving the reflected transmission signals. Further, only four discrete transmit antennas are used to provide the 360° azimuthal coverage. In accordance with the illustrated embodiment, the transmission signal is preferably generated by a single transmitter centrally located in the aircraft, although four separate, smaller transmitters could be located proximate the four transmit antennas. An array of receive antennas is associated with each transmit antenna. Since only four discrete transmit antennas are used for radar signal transmission, it is not necessary to effect any significant modifications to the aircraft structure in order to accommodate these antennas. Further, since the receive antennas perform a receive only function, it is not necessary to route large conductor power cables to those antennas or provide cooling facilities for them. As a result, the receive antenna arrays can be accommodated within a conventional aircraft structure. That is, there is no need to perform special structural modifications to a conventional aircraft design to enable mounting of the receive antenna arrays.

Thus, in accordance with the illustrated embodiment of the present invention, the imaging radar system can be mounted in an aircraft without the need for significant structural modifications. As a result, the design of the aircraft is not mission dedicated. Since the aircraft is available for performance of other missions, the design development cost is not allocated to fulfillment of the single mission.

Figure 1:
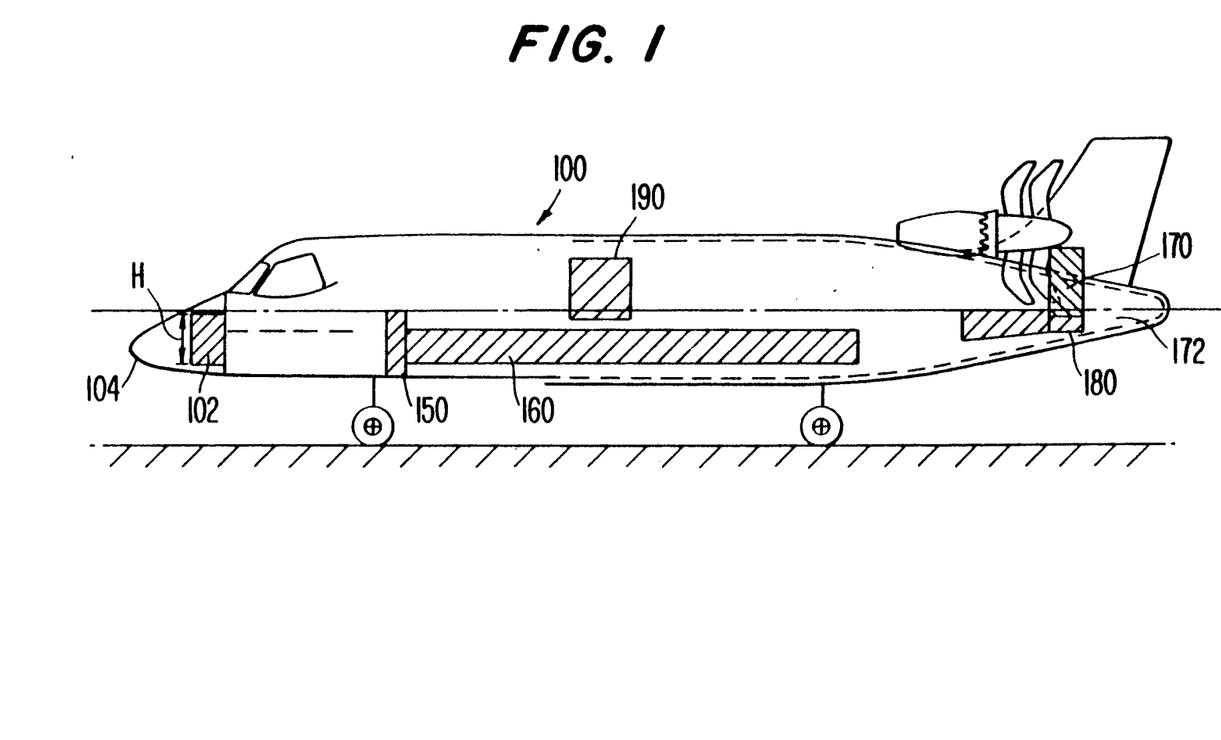
FIG. 1 illustrates a side view of an aircraft in which is mounted an imaging radar system constructed in accordance with the present invention.
Figure 2:
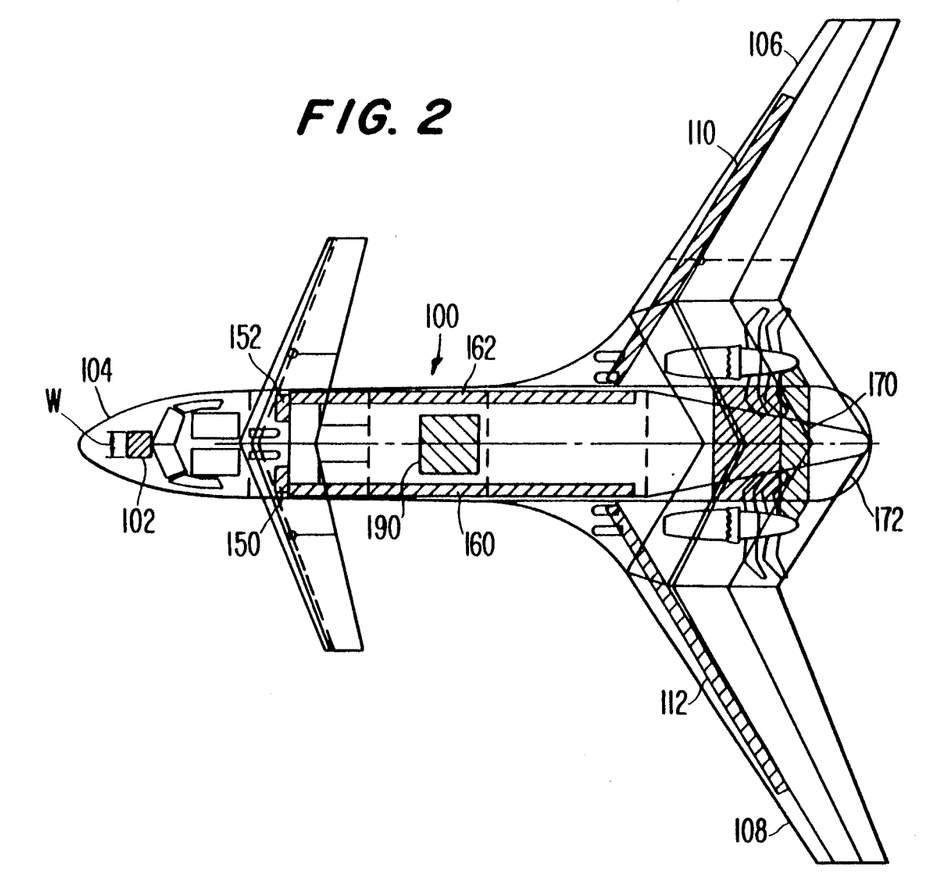
FIG. 2 illustrates a top view of the aircraft illustrated in FIG. 1.
Figure 3:
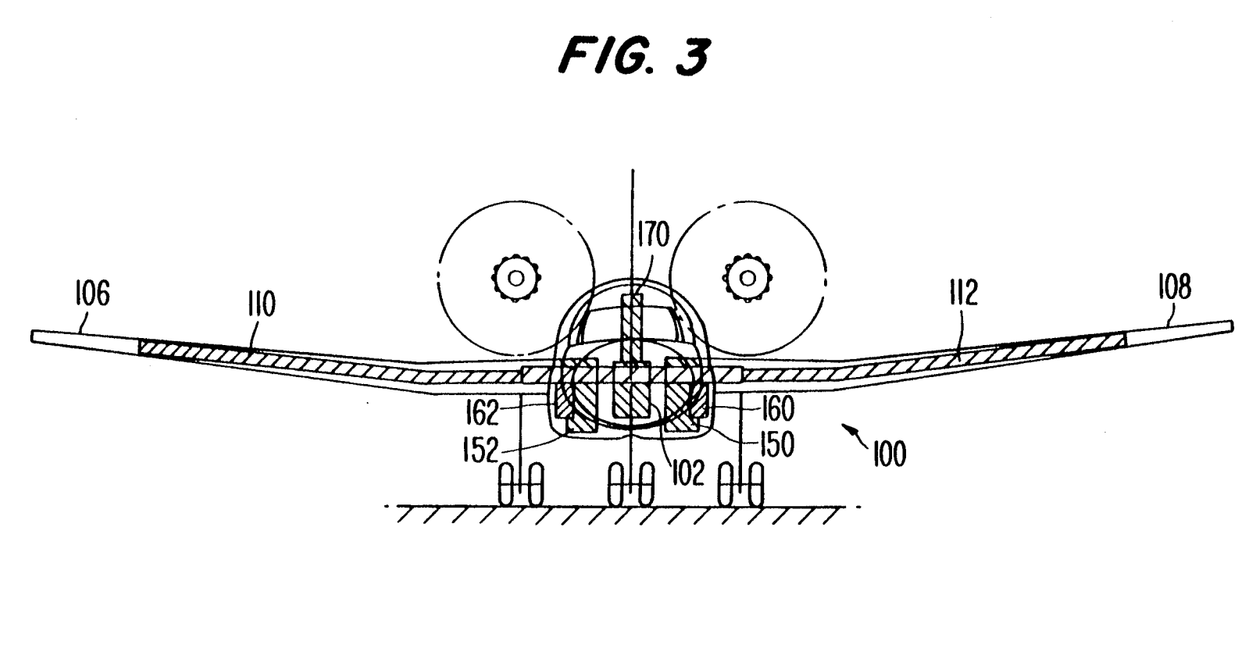
FIG. 3 illustrates a front view of the aircraft illustrated in FIG. 1.

Referring now to the drawings, FIGS. 1, 2 and 3 respectively diagrammatically illustrate side, top and front views of an exemplary aircraft 100 in which the imaging radar system of the present invention is mounted. A single, forward-looking transmit antenna 102 is mounted in a nose portion 104 of the aircraft. Transmit antenna 102 preferably provides azimuthal coverage over approximately 60° to 90° symmetrically about and relative to the aircraft nose portion. The preferred configuration of transmit antenna 102 is described in terms of a height dimension "H" illustrated in FIG. 1 and a width dimension "W" illustrated in FIG. 2. It is known in the art that as dimension H is increased, the corresponding transmission signal beam narrows in height and vice versa. Similarly, as dimension W is increased, the width of the transmission signal beam narrows and vice versa. Antenna 102 is preferably configured to provide a transmission beam that is narrow in height but wide enough to provide the above noted preferred azimuthal coverage. The narrow beam height is preferred since for the AEW mission it is desired to transmit energy only near the horizon to perform long range surveillance. An exemplary desirable elevational coverage at the 50 nm range is approximately 15°.

To provide the preferred narrow beam height, dimension H of antenna 102 is made large relative to dimension W. Without limitation, an exemplary transmit antenna 102 can be provided as a transmitter array consisting of five UHF-band transmitter elements stacked one on top of the other. The height dimension H of exemplary transmit antenna so constructed is approximately 50 inches, while the width dimension W is approximately 20 to 30 inches. The exemplary 50 inch height results in an elevational coverage of approximately 20°. It is important to note that by providing transmit antenna 102 figured to be tall and narrow, it is more easily accommodated into a conventional aircraft structure than if the transmitter were wide in the W dimension. For example, the narrow antenna more readily fits between two adjacent structural members. Further, provision of the wide azimuthal coverage of the individual antenna minimizes the total number of transmit antennas required to achieve 360° coverage.

Still referring to FIG. 1-3, an array of receive antennas for receiving reflections of transmissions signals transmitted by transmit antenna 102, is provided in the leading edges of wings 106 and 108 of aircraft 100. This receive antenna array actually consists of an array 110 mounted in the leading edge of wing 106 and an array 112 mounted in the leading edge of wing 108. Each receive antenna in the receive antenna array is preferably provided as a half-wave element. The half-wave elements of the arrays are preferable regularly spaced relative to one another. As indicated above, the individual receive antenna elements only perform a receiving function and therefore do not require connection to large conductor power cables or provision of cooling. As a result, the amount of space to be allocated for mounting arrays 110 and 112 in the leading edges of 106 and 108, respectively, is minimal and no special structural modifications are required to accommodate the receive antenna arrays.

It is preferred herein that receiver apparatus dedicated to each antenna element in each receive antenna array be mounted proximate an associated antenna element. The preferred receiver apparatus consists primarily of integrated circuitry and therefore poses minimal space, weight and cabling requirements. The nature of the preferred receiver apparatus is described more fully below.

Aircraft 100 is further fitted with two-side looking transmit antennas 150 and 152 for transmitting a radar signal relative to the sides of the aircraft. Each side-looking antenna 150,152 preferably has a height dimension similar to that described above for antenna 102. The width dimension of each antenna 150,152 is preferably approximately one-half to two-thirds the width described above for antenna 102. As a result, each side-looking transmit antenna transmits a radar beam that is narrow in height but covers a wide azimuth angle. Each antenna 150,152 preferably provides approximately 90° to 120° of azimuthal coverage. Since both side-looking transmit antennas are tall and narrow, they are easily mounted within a conventional aircraft structure, e.g., positioned between structural members and no special structural features are required to accommodate these antennas.

Side-looking receive antenna arrays 160 and 162 are mounted in this sides of the fuselage of aircraft 100 to respectively receive reflections of the signals transmitted by transmit antennas 150 and 152. Each receive antenna array 160,162 is constructed substantially the same as arrays 110 and 112 described above. Thus, arrays 160 and 162 do not require substantial mounting space, routing of large conductor cables or provision of cooling. As a result, these antenna arrays can be accommodated within a conventional aircraft structure.

Aircraft 100 is additionally fitted with a single rearward looking transmit antenna 170 mounted in a tail portion 172 of aircraft 100. As seen in FIGS. 1-3, antenna 170 has a height dimension that is greater than its width dimension. As in the case of transmit antennas 102, 150 and 152, the height and width dimensions of transmit 170 are selected to provide a transmission beam that affords wide azimuthal coverage, preferable on the order of approximately 60° to 90°, and a narrow beam height. Also, the shape of transmit antenna 170 enables its mounting within the aircraft without adverse impact on the aircraft structural design.

A rearward receive antenna array 180 is mounted in aircraft tail portion 172 to receive reflections of signals transmitted by transmit antenna 170. Receive array 180 (FIG. 1) is preferable constructed of the same regularly spaced half-wave elements as receive arrays 110, 112, 160 and 162. As a result, receive array 180 can be accommodated within the conventional aircraft structure.

With the transmit antennas and receive antenna arrays as described above, each of the side-looking transmit antennas and its associated side-look of receive antenna arrays provide azimuthal coverage of 90° to 120° to each side of the aircraft. Further, each of the transmit antennas and associated receive antennas arrays respectively mounted in the nose and tail portions of aircraft 100 provide azimuthal coverage of 60° to 90° relative to the front and rear of the aircraft. Thus with the respective azimuthal coverages of the four sets of transmit antennas and respectively associated receive antenna arrays properly chosen, the radar system of the illustrated embodiment provides 360° of azimuthal coverage relative to aircraft 100.

Further in accordance with the illustrated embodiment, operation of the radar system is switched from one to another of the four transmit antennas, so that only one of the four transmit antennas operates at any one time. As a result, the reflected signals received by each receive antenna array can be uniquely identified as resulting from signals transmitted by the associated transmit antenna.

Figure 4:
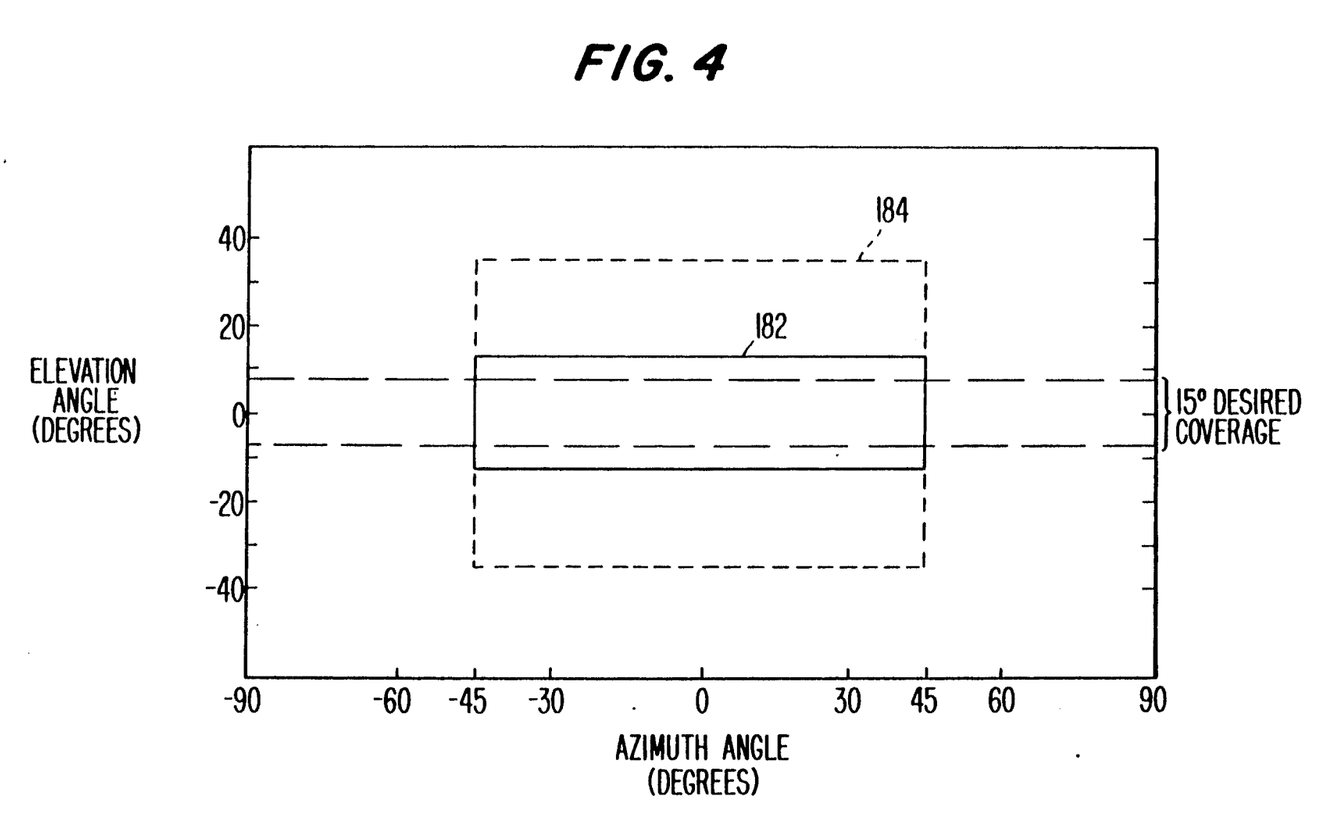
FIG. 4 illustrates an exemplary plot of transmit and receive antenna elevational and azimuthal coverage.

By way of example, FIG. 4 illustrates an exemplary plot of the azimuthal and elevational coverage that can be provided by forward-looking antenna 102 and its associated receive antenna arrays 110 and 112. The elevational and azimuthal coverage provided by transmit antenna 102, having the above described exemplary construction consisting of a stack of five transmitter elements having a total height of approximately 50 inches, is indicated by the rectangular area delineated by solid line 182. This exemplary instruction results in an elevational coverage of approximately 25° and an azimuthal coverage of approximately 90°. The elevational coverage could be further reduced to the preferred 15° coverage, also shown in FIG. 4, by increasing the height of transmit antenna 102.

Still referring to FIG. 4, the elevational and azimuthal coverage provided by receive antenna arrays 110 and 112 is indicated by the rectangular area delineated by the dashed line 184. The receive antenna arrays provide an elevational coverage of approximately 70°. As a result, the receive antenna arrays can receive substantially all power transmitted by antenna 102 that may be reflected by potential targets to be tested within the elevational region of interest.

It is preferred herein that the transmission signals transmitted by transmit antennas 102, 150, 152 and 170 be generated by a central transmitter 190 that is centrally located within the aircraft fuselage. This is diagrammatically illustrated in FIGS. 1 and 2. Thus, power cable is routed from the center transmitter, via distributor apparatus (not shown in FIGS. 1-3), to each of the four transmit antennas. As a result, the total amount of large conductor cabling is minimal since it is limited to the cable routings between the central transmitter and four transmit antennas. Further, the distributor apparatus need not be large since it serves to switch the transmission signal among only four transmit antennas.

Figure 5:
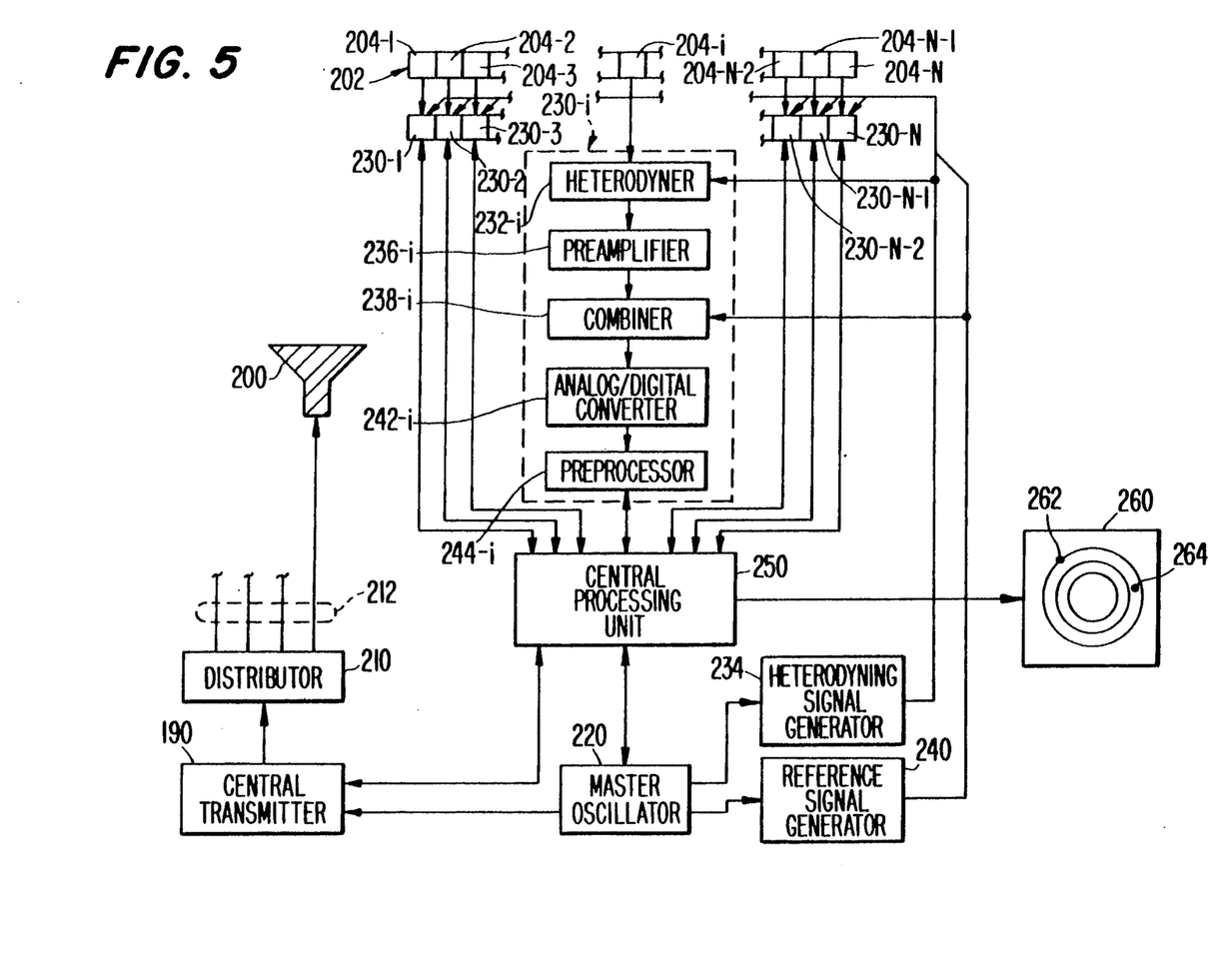
FIG. 5 diagrammatically illustrates a preferred embodiment of the imaging radar system of the present invention.

FIG. 5 diagrammatically illustrates a portion of the radar system mounted in aircraft 100 including apparatus for generating the transmission signals. In particular, FIG. 5 illustrates a single transmit antenna 200, that is representative of any one of the four transmit antennas 102, 150, 152 and 170, and a receive antenna array 202 for receiving reflections of signals transmitted by antenna 200. Array 202 is representative of any one of the receive antenna arrays described above and illustrated in FIGS. 1-3. Receive antenna array 202 is diagrammatically illustrated as consisting of N half-wave antenna elements 204-1, 204-2, 204-3,..., 204-i,..., 204-(N-2), 204-(N-1) and 204-N.

As described above, the transmission signal transmitted by transmit antenna 200 is generated by central transmitter 190. The output of the central transmitter is routed through distributor apparatus 210 that distributes the transmission signal to the four transmit antennas, this being illustrated by four cables 212 emanating from the distributor. The frequency at which the central transmitter transmits is determined by a master oscillator 220 that generates an oscillating signal for use by the transmitter. As is well known in the art, frequency multiplication may be used to enable transmission at a predetermined multiple of the master oscillator generated frequency.

The imaging radar system of the present invention includes receiver means for conditioning the signals received by the receive antennas. As embodied herein, the receiver means is provided as substantially identical receiver circuits 230-1, 230-2,..., 230-N respectively associated with antenna elements 204-1, 204-2,...204-N of receive array 202. Receive antenna array 202 and it's receiver circuits 230-1, 230-2,...230-N differs from the prior art phased array described above since the received signals from each antenna element are simultaneously received with zero delay between antenna elements. The signal received by each receive antenna element is applied to the receiver circuit associated therewith. An exemplary receiver circuit 230-i, associated with receive antenna element 204-i, is diagrammatically illustrated and representative of the construction of each of the receiver circuits.

The imaging radar system of the present invention includes means for conditioning the received signal by adding to it a heterodyning signal. As embodies herein, the means for conditioning is provided as a heterodyning circuit 232-i, included in receiver circuit 230-i, in which a heterodying signal is added to the received signal to yield a resultant signal having a frequency equal to the difference between the heterodyning and received signals. The imaging radar system of the present invention also includes means for generating a heterodyning signal. As embodied herein, the heterodyning signal generating means is provided as a heterodyning signal generator 234 coupled to receive the master oscillator generated frequency. While the heterodyning signal could be generated at each heterodyning circuit, it is preferred herein that a single heterodyning signal be generated by heterodyning signal generator 234. The heterodyning signal generated by generator 234 is illustrated in FIG. 5 as being distributed to the plurality of receiver circuits.

Since the master oscillator generated signal is the basis for both the transmission and heterodyning signals, the frequency of the resultant signal can be, and is preferably, set to be a predetermined value. Thus, heterodyning circuit 232-i provides the resultant signal containing the phase and amplitude information of the received signal but having a predetermined frequency that remains constant irrespective of changes in the transmission signal frequency.

The imaging radar system of the present invention includes means for amplifying the received signals. As embodied herein, the amplifying means is provided as a preamplifier circuit 236-i coupled to receive the resultant signal provided by the heterodyning circuit. Since the frequency of the resultant signals is predetermined, the preamplifier circuit can advantageously be turned to this frequency.

The imaging radar system of the present invention includes means for combining the received signal with a reference signal and means for generating the reference signal. As embodied herein, the combining means is provided as a combiner circuit 238-i and the reference signal generating means is provided as a reference signal generator 240. Combiner circuit 238-i is coupled to receive, on a first input, the amplified signal provided by preamplifier circuit 236-i and is further coupled to receive, on a second input, the reference signal. Signal generator 240 is coupled to master oscillator 220 so that it can generate the reference signal to have the predetermined frequency of the resultant signal and thereby be coherent therewith. The phase relationship between the reference and resultant signals is unknown. In general, combiner circuit 238-i of receiver circuit 230-i operates to combine the resultant signal with the reference signal and produces the value of an interference grating signal at its output. That is, the signal outputted by combiner 238-i represents one sample point of the interference grating across the entire receive antenna array 202.

While the reference signal could be generated at each combiner circuit, it is preferred to generate a single reference signal and distribute it to the receiver circuits, as illustrated in FIG. 5.

The imaging radar system of the present invention includes means for converting the interference grating signal to digital form. As embodied herein, the converter means is provided as an analog-to-digital (A/D) converter 242-i coupled to receive and provide the interference grating signal in digital form. The imaging radar system of the present invention additionally includes preprocessing means that, as embodied herein, is provided as a preprocessing circuit 244-i. The preprocessing circuit is coupled to receive the A/D converter output and integrates successive interference grating signals in order to filter out noise effects.

The inventive imaging radar system yet further includes processing means that, as embodies herein, is provided as a central processing unit (CPU) 250. The preprocessing circuit is coupled to CPU 250 tow which it provides results of its preprocessing operations and from which it receives instructions for controlling the manner in which the preprocessing functions are carried out.

The imaging radar system of the present invention configured as illustrated and described herein, enables imaging information to be processed in a number of different ways. In a preferred processing scheme, the transmit antenna transmits a group of successive transmission pulses the received reflections of which are used to form images of signal reflecting objects. A time period over which a reflection of each transmission pulse is received is divided into range cells respectively corresponding to the distances from which the reflections are returning. CPU 250 is coupled to the master oscillator and central transmitter to both control their operation and receive information regarding the times at which transmission pulses are generated. CPU 250 is thereby enabled to control the operation of preprocessing circuit 240-i to process information on a range cell by range cell basis. Further, since, as preferred herein, a group of successive transmission pulses is used for imaging, CPU 250 controls the preprocessing circuit operation on a group-by-group basis.

In accordance with a preferred embodiment of the present invention, the preprocessing circuit is controlled to integrate successive values provided by the A/D converter, corresponding to the successive pulses, for each range cell. This integration is performed to minimize the effects of noise in the received signals. That is, the integration serves to average noise while accumulating true signal data. The preprocessing circuit is also controlled by the CPU to adjust the integration operations for the effect of Doppler shift. This aspect of the control is more fully described below. In accordance with the present invention, the preprocessing means includes means for controlling the integration in accordance with the Doppler shift. As embodied herein, the preprocessing circuit includes a microprocessor, for performing the integration operations, that is programmed to control the integration in accordance with the Doppler effect. The preprocessing circuit further includes a memory for storing the integration results. A result provided by the preprocessing circuit is amplitude information accumulated for each of the various range cells over the successive pulses, where the amplitude is representative of the power level of the received signals.

While each preprocessing circuit can be constructed to include a microprocessor, as described above, each preprocessing circuit can instead be constructed to include a plurality of low-complexity bit-serial processing elements connected in a parallel architecture and controlled to perform the integration operation. Such a parallel architecture enables performance of the integration operation at high speed.

Figure 6A:
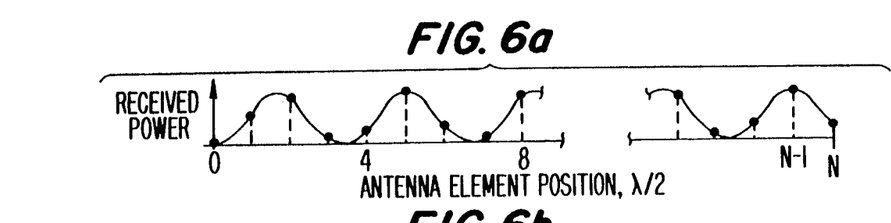
FIG. 6a-6d respectively illustrate plots of interference grating signals received by an antenna array.

FIG. 6a illustrates a plot of amplitude, for a particular range cell, provided by the respective preprocessing circuits of receive antennas 204-1 through 204-N in response to a first of the successive pulses in a transmitted pulse group. The abscissa of the plot represents the physical positions of the individual antenna elements of the receive antenna array. The ordinate of the plot represents an amount of power received by each antenna element, for the particular range cell, after conditioning by combining with the reference signal. The amount of received power at each receive antenna element, as provided by the combining circuit, represents a single digital data value provided by the A/D converter to the preprocessing circuit for the particular range cell. Thus, the operating speeds of both the A/D converter and preprocessing circuit are in part a function of the time duration of each range cell. The point plotted in FIG. 6a for each antenna element represents a sampled value of the interference grating signal provided by the combining circuit for the particular range cell. A different set of such sampled values would therefore be provided by each preprocessing circuit for each range cell.

Figure 6B:
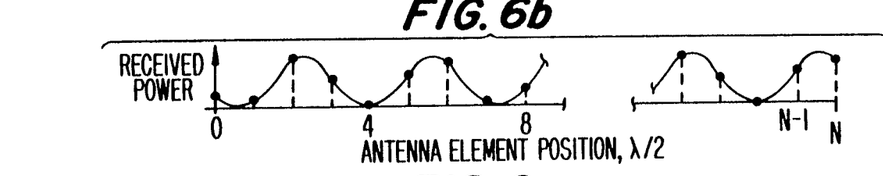
Figure 6C:
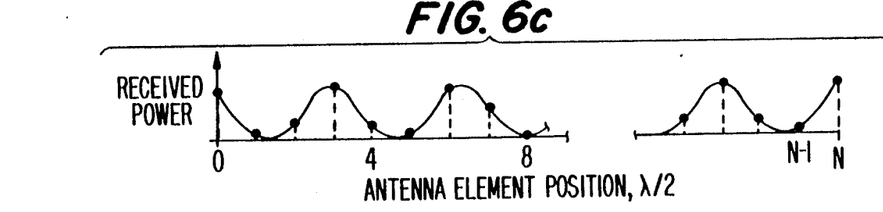
Figure 6D:
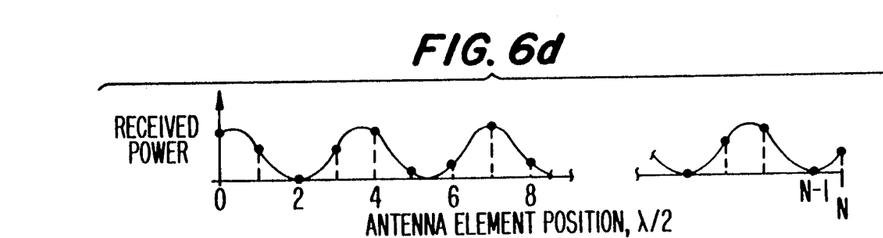

FIGS. 6b, 6c, 6d illustrate plots having the same abscissa and ordinate axes as the plot in FIG. 6a. FIGS. 6b-6d illustrate plots for the same range cell as plotted in FIG. 6a but for successive ones of the pulses of the group of pulses transmitted by the antenna. That is, FIG. 6a, 6b, 6c and 6d respectively represent the interference grating signal values, for the same range cell, plotted for four successive transmission signal pulses of a pulse group. As can be seen, the interference grating signals of the signals received by the receive antenna array are sinusodial in form. Generally, for the relatively short period of time, e.g., 1/10 to ¼ second, over which the group of pulses is transmitted and received, the sinusoids corresponding to the respective pulses all have the same period. However, the sinusoidal interference grating signal corresponding to each successive pulse is phase shifted from that of the previous pulse by an amount that is a function of the Doppler shift. As is known in the art, the Doppler shift is attributable to the movement of both aircraft 100 carrying the radar equipment and the object providing the reflections of the transmission signal pulses. In order for preprocessing circuit 240-i to integrate information corresponding to successive pulses, it is necessary that it compensate for such Doppler shifts. This is preferably accomplished, in part, by provision to CPU 250 of the data results, for each range cell, associated with each received pulse. The inventive radar system includes means for determining a Doppler shift associated with the received signals. As embodied herein, and in accordance with methods known in the art, CPU 250 is programmed to compute from the integrated information provided thereto an estimate of the Doppler shift and accordingly control the operation of each preprocessing circuit to adjust for the Doppler shift effect. The CPU preferably refines its estimate of Doppler shift as more information is received. A more detailed description of the treatment of Doppler shift in radar systems is contained in "Introduction to Radar Systems" by M. Skolnick, McGraw-Hill Book Company, 1980.

As can be seen, the data received by CPU 250 from the N preprocessing circuits represents N samples of interference grating signal data as a function of receive antenna element position across the N-element receive antenna array. When CPU 250 receives the interference grating data integrated over a predetermined number of received pulses (four pulses in the illustrated embodiment), it performs a spatial Fourier transform (SFT) on the N-data samples. Analogous to a time Fourier transform in which a known time separates the signals being transformed, the physical distance between the receive antenna elements represents the separation between the data elements on which the SFT is performed. Further, while a time Fourier transform yields respective amplitudes of discrete frequency components of the data, the SFT yields angle components that correlate directly to angles, relative to the receive antenna array, at which transmission signal reflecting objects are positioned. Thus, the CPU by performing the SFT for each range cell provides object angle information for each range cell. The SFT results, as a function of range cell, represent a detection pattern. It is noted that the successive SFT results are preferably used by the CPU to further estimate the Doppler effect for, inter alia, controlling operation of the preprocessing circuits.

In order to provide a display of radar images, it is first necessary to subject the SFT results to display processing that includes threshold processing in which only results greater than a predetermined threshold are processed for display. Further, in order to display radar images, display processing also requires correlating the detection pattern with the actual range information corresponding to the range cells. The present invention thus includes means for correlating the detection pattern with range information. As embodied herein, display processing, include range correlating, is performed by additional programming of CPU 250, although a dedicated display processor could be coupled to receive appropriate data from the CPU.

The present invention includes means for displaying a spatial distribution of the transmission signal reflecting objects. As embodied herein, the displaying means is provided as a visual display 260, e.g., a CRT screen, illustrated in FIG. 5. Exemplary transmission signal reflecting objects 262 and 264 are displayed on the screen of display 260 which shows 360° area of coverage corresponding to the 360° azimuthal coverage provided by the radar system of the illustrated embodiment. As part of the display processing of the SFT results, the angle information derived from the SFT is stabilized with respect to a reference, e.g. north.

While for simplicity of explanation, the radar system of the illustrated embodiment is described as performing the SFT on the preprocessing circuit integration results, and then displaying the display processed SFT result, there is substantial flexibility in the manner in which the integration is performed. It is preferred herein that, in addition to the integration performed by the preprocessing circuit, the CPU integrates a predetermined number of SFT results. For example and without limitation, the CPU could perform the SFT on the integration result corresponding to the two most recently received successive pulses. That is, the CPU would perform the SFT following preprocessing of every other received pulse signal The successive SFT results would be buffered and integrated by the CPU. In this manner, the integration function would be shared between the preprocessing circuits and the CPU.

In accordance with the radar system configuration illustrated in FIG. 5, the receiver circuit performs a preprocessing function after which the CPU performs the SFT computation. Further, the Doppler effect is estimated by the CPU from results provided by the preprocessing circuit and from successive SFT computational results. However, the invention is not so limited. In an alternate signal processing configuration (not illustrated) for the receiver circuit illustrated in FIG. 5, integration by the preprocessing circuit would be eliminated, so that CPU 250 received the nonintegrated output of A/D converter 238-i, for each pulse and each range cell. The CPU would perform the SFT on the set of data for each pulse and range cell. The successive SFT results computed by the CPU for each range cell would be independent of Doppler effect and directly integrable. One disadvantage of this alternative processing configuration is the need to perform a greater number of SFT computations within a short time period. In order to accommodate these additional computational requirements, it would likely be necessary to provide a buffer to hold data provided by each receiver circuit. Additional computing resources could also be allocated to perform the subsequent integration of the SFT results.

Another alternative signal processing configuration is as illustrated in FIG. 5 and with preprocessing circuit 240-i being provided with additional memory capacity. A plurality of memory planes corresponding to different possible Doppler shifts would be allocated for each range cell. Then, the digital outputs of A/D converter 238-i corresponding to the successive pulses would be integrated in all of the memory planes in accordance with the Doppler shift corresponding to each memory plane. After receipt of a predetermined number of pulses, it would be concluded that the memory plane in which the greatest difference existed between maximum and minimum integration results corresponded most closely to the actual Doppler shift.

The present invention as illustrated and described herein also comprises a method for imaging radar signal reflecting objects. The method comprises the steps of transmitting a transmission signal in a predetermined direction; receiving as received signal reflections of the transmission signals at each of a plurality of receive antennas of a receive antenna array; combining, for each receive antenna, the received signal with a reference signal to provide a interference grating signal corresponding to the received signal; performing a spatial Fourier transform on the interference grating signals respectively corresponding to the received signals; and obtaining, as results of the spatial Fourier transform, information about positions of transmission reflecting objects relative to the receive antenna array.

While it is preferred herein to provide a central transmitter for generating a transmission signal distributed to the four transmit antennas, the invention can also be practiced using a distributed transmitter system consisting of four smaller transmitters respectively located proximate the four transmit antennas. This limited number of smaller transmitters can be mounted without the need for structural modification of the aircraft. Further, the power cable and cooling requirements for the distributed transmitter system do not require substantial physical mounting space or represent a significant weight penalty in view of the limited number of transmitters.

The illustrated embodiment of the present invention comprises four transmit antennas and four corresponding receive antenna arrays mounted to provide 360° of azimuthal coverage. However, the invention is not limited to this specific number of transmit antennas and corresponding receive arrays and can be successfully practiced with a larger or smaller number of transmit antennas, and corresponding receive arrays, that provide a desired azimuthal coverage. It is important, however, that the number of transmit antennas not be so great as to require structural modification to the aircraft to enable their mounting.

In accordance with the practice known in the art, CPU 250 may in part be constructed to include hardwired circuits dedicated to performing certain repetitive computations, rather than effecting such computations through software, in order to enable faster operation of CPU 250.

While the imaging radar system of the present invention is illustrated and described as mounted for practice in an aircraft, the invention is not so limited. The inventive system may find utility being mounted in other environments, e.g., in a ground installation, on ships, etc.

Thus, it is intended that the present invention cover the modifications and variations of this invention provided they come within the scope of the appended claims and their equivalents.

What is claimed is:

1. An imaging radar system, comprising:
 a transmitter for generating a microwave transmission signal;
 a transmit antenna, operatively coupled to said transmitter, for transmitting the transmission signal in a predetermined direction;
 a plurality of receive antennas mounted to form a receive antenna array for receiving signals that are reflections of the transmission signal;
 a plurality of receiver means, each coupled to a corresponding one of said plurality of receive antennas, for receiving with a zero delay signals simultaneously received by said plurality of receive antennas and for respectively preparing the signals received by said receive antennas for processing;
 means for generating a reference signal;
 each said receiver means including means for combining the received signal with the reference signal and providing an interference grating signal corresponding to the received signal; and processing means, operatively coupled to receive the interference grating signals respectively corresponding to the received signals received by said plurality of receive antennas, for performing a spatial Fourier transform of the interference grating signals, a result of said spatial Fourier transform being a detection pattern that locates transmission signal reflecting objects relative to said receive antenna array.

2. An imaging radar system, comprising:
a transmitter for generating a microwave transmission signal;
a transmit antenna, operatively coupled to said transmitter, for transmitting the transmission signal in a predetermined direction;
a plurality of receive antennas mounted to form a receive antenna array for receiving signals that are reflections of the transmission signal;
a plurality of receiver means, each coupled to a corresponding one of said plurality of receive antennas, for respectively preparing the signals received by said receive antennas for processing;
means for generating a reference signal;
each said receiver means including means for combining the received signal with the reference signal and providing an interference grating signal corresponding to the received signal;
processing means, operatively coupled to receive the interference grating signals respectively corresponding to the received signals received by said plurality of receive antennas, for performing a spatial Fourier transform of the interference grating signals, a result of said spatial Fourier transform being a detection pattern that locates transmission signal reflecting objects relative to said receive antenna array;
wherein said transmitter generates the transmission signal to have a first predetermined frequency;
said receiver means including means for generating a heterodyning signal having a frequency that differs from the first predetermined frequency by a second predetermined frequency;
means, included in each receiver means, for conditioning the received signal by adding the heterodyning signal with the received signal to yield a resultant signal having the second predetermined frequency; and
said combining means combining the resultant signal with the reference signal.

3. The radar system of claim 2 wherein each said receiver means includes means for amplifying the received signals, said conditioning means adding the amplified received signal with the heterodyning signal.

4. The radar system of claim 3 wherein each said receiver means includes analog-to-digital (A/D) converter means for converting the interference grating signal to digital form.

5. An imaging radar system, comprising:
a transmitter for generating a microwave transmission signal;
a transmit antenna, operatively coupled to said transmitter, for transmitting the transmission signal in a predetermined direction;
a plurality of receive antennas mounted to form a receive antenna array for receiving signals that are reflections of the transmission signal;
a plurality of receiver means, each coupled to a corresponding one of said plurality of receive antennas, for respectively preparing the signals received by said receive antennas for processing;
means for generating a reference signal;
each said receiver means including means for combining the received signal with the reference signal and providing an interference grating signal corresponding to the received signal;
processing means, operatively coupled to receive the interference grating signals respectively corresponding to the received signals received by said plurality of receive antennas, for performing a spatial Fourier transform of the interference grating signals, a result of said spatial Fourier transform being a detection pattern that locates transmission signal reflecting objects relative to said receive antenna array;
wherein each received signal is received over a receive time period divided into a plurality of range cells that respectively correspond to different distances from said receive antenna array;
said transmit antenna transmitting a group of successive transmission signals; and
each said receiver means including preprocessing means for integrating, for each of said range cells, successive interference grating signals provided by said combining means and corresponding to the successive transmission signals, said processing means performing the spatial Fourier transform on integration results provided by said preprocessing means.

6. An imaging radar system for mounting in an aircraft, comprising:
a transmitter for generating a microwave transmission signal;
a transmit antenna, operatively coupled to said transmitter, for transmitting the transmission signal in a predetermined direction relative to the aircraft;
a plurality of receive antennas mounted in the aircraft to form a receive antenna array for receiving signals that are reflections of the transmission signal;
a plurality of receiver means, each coupled to a corresponding one of said plurality of receive antennas, for receiving with a zero delay signals simultaneously received by said plurality of receive antennas and for respectively preparing the signals received by said receive antennas for processing;
means for generating a reference signal;
each said receiver means including means for combining the received signal with the reference signal and providing an interference grating signal corresponding to the received signal; and
processing means, operatively coupled to receive the interference grating signals respectively corresponding to the received signals received by said plurality of receive antennas, for performing a spatial Fourier transform of the interference grating signals, a result of said spatial Fourier transform being a detection pattern that locates transmission signal reflecting objects relative to said receive antenna array.

7. The radar system of claim 6 wherein each said receive antenna is a half-wave element; and
said receive antennas in said receive antenna array having a predetermined regular spacing relative to one another.

8. The radar system of claim 6 wherein said transmit and receive antennas are conformally mounted in the aircraft.

9. An imaging radar system for mounting in an aircraft, comprising:
a transmitter for generating a microwave transmission signal;
a transmit antenna, operatively coupled to said transmitter, for transmitting the transmission signal in a predetermined direction relative to the aircraft;
a plurality of receive antennas mounted in the aircraft to form a receive antenna array for receiving signals that are refections of the transmission signal;
a plurality of receiver means, each coupled to a corresponding one of said plurality of receive antennas, for respectively preparing the signals received by said receive antennas for processing;
means for generating a reference signal;
each said receiver means including means for combining the received signal with the reference signal and providing an interference grating signal corresponding to the received signal;
processing means, operatively coupled to receive the interference grating signals respectively corresponding to the received signals received by said plurality of receive antennas, for performing a spatial Fourier transform of the interference grating signals, a result of said spatial Fourier transform being a detection pattern that locates transmission signal reflecting objects relative to said receive antenna array;
wherein said transmitter generates the transmission signal to have a first predetermined frequency;
said receiver means including means for generating a heterodyning signal having a frequency that differs from the first predetermined frequency by a second predetermined frequency;
means, included in each receiver means, for conditioning the received signal by adding the heterodyning signal with the received signal to yield a resultant signal having the second predetermined frequency; and
said combining means combining the resultant signal with the reference signal.

10. The radar system of claim 9 wherein each said receiver means includes means for amplifying the received signals, said conditioning means adding the amplified received signal with the heterodyning signal.

11. The radar system of claim 10 wherein each said receiver means includes analog-to-digital (A/D) converter means for converting the interference grating signal to digital form.

12. An imaging radar system for mounting in an aircraft, comprising:
a transmitter for generating a microwave transmission signal;
a transmit antenna, operatively coupled to said transmitter, for transmitting the transmission signal in a predetermine direction relative to the aircraft;
a plurality of receive antennas mounted in the aircraft to form a receive antenna array for receiving signals that are reflections of the transmission signal;
a plurality of receiver means each coupled to a corresponding one of said plurality of receive antennas, for respectively preparing the signals received by said receive antennas for processing;
means for generating a reference signal;
each said receiver means including means for combining the received signal with the reference signal and providing an interference grating signal corresponding to the received signal;
processing means, operatively coupled to receive the interference grating signals respectively corresponding to the received signals received by said plurality of receive antennas, for performing a spatial Fourier transform of the interference grating signals, a result of said spatial Fourier transform being a detection pattern that locates transmission signal reflecting objects relative to said receive antenna array;
wherein each received signal is received over a receive time period divided into a plurality of range cells that respectively correspond to different distances from said receive antenna array;
said transmit antenna transmitting a group of successive transmission signals; and
each said receiver means including preprocessing means for integrating, for each of said range cells, successive interference grating signals provided by said combining means and corresponding to the successive transmission signals, said processing means performing the spatial Fourier transform on integration results provided by said preprocessing means.

13. The radar system of claim 12 wherein said processing means includes means for determining a Doppler shift associated with the received signals; and
each said preprocessing means being operatively coupled to said processing means to receive signals representative of the determined Doppler shift and including means for controlling the integration of the successive received signals in accordance with the determined Doppler shift.

14. The radar system of claim 12 wherein said processing means performs, for each said range cell, the spatial Fourier transform on the integration results corresponding to a predetermined number of the interference grating signals; and
said processing means including means for integrating, for each said range cell, successive spatial Fourier transform results corresponding to the group of successive transmission signals.

15. The radar system of claim 12, said preprocessing means including, for each range cell, a plurality of memory planes each corresponding to a different possible Doppler shift associated with the received signals;
said preprocessing means integrating the successive interference grating signals in accordance with the different possible Doppler shifts and storing the integration results in the corresponding ones of the plurality of memory planes; and
said preprocessing means including means for identifying a one of said memory plane in which a greatest difference exists between maximum and minimum integration results, the identified memory plane corresponding to the Doppler shift associated with the received signals.

16. The radar system of claim 6 further including means for correlating the detection pattern with range information and for displaying a spatial distribution of the transmission signal reflecting objects.

17. The radar system of claim 6 further including a plurality of transmit antennas located within the aircraft; and
a plurality of receive antenna arrays like in number to the plurality of transmit antennas and respectively associated with different ones of said transmit antennas, each said receive antenna array being located in the aircraft to receive reflections of transmission signals transmitted by the transmit antenna associated therewith.

18. The radar system of claim 6 wherein each received signal is received over a receive time period divided into a plurality of range cells that respectively correspond to different distances from said receive antenna array;
said transmit antenna transmitting a group of successive transmission signals;
said combining means providing, for each said range cell, interference grating signals respectively corresponding to the transmission signals of the group of transmission signals;
said processing means performing, for each said range cell, the spatial Fourier transform of the interference grating signals corresponding to each transmission signal of the group of transmission signals; and
said processing means including means for integrating, for each said range cell, the spatial Fourier transform results respectively corresponding to the transmission signals of the group of transmission signals.

19. A method for imaging radar transmission signal refecting objects, comprising the steps of:
transmitting a transmission signal in a predetermined direction;
receiving, as received signals, reflections of the transmission signals at each of a plurality of receive antennas of a receive antenna array;
combining signals simultaneously received by said plurality of receive antennas with a reference signal to provide an interference grating signal corresponding to the received signals;
performing a spatial Fourier transform on the interference grating signals respectively corresponding to the received signals; and
obtaining, as results of the spatial Fourier transform, information about positions of transmission signal reflecting objects relative to the receive antenna array.

20. A method for imaging radar transmission signal reflecting objects, comprising the steps of:
transmitting a transmission signal in a predetermined direction;
receiving, as received signals, reflections of the transmission signals at each of a plurality of receive antennas of a receive antenna array;
combining, for each receive antenna, the received signal with a reference signal to provide an interference grating signal corresponding to the received signal;
performing a spatial Fourier transform on the interference grating signals respectively corresponding to the received signals;
obtaining, as results of the spatial Fourier transform, information about positions of transmission signal reflecting objects relative to the receive antenna array;
wherein said transmission signal is transmitted at a first predetermined frequency;
said method including a step; following said receiving step, of conditioning the received signal by heterodyning the received signal with a heterodyning signal having a frequency that differs from the first predetermined frequency by a second predetermined frequency, said heterodyning step yielding a resultant signal having the second predetermined frequency; and
said combining step comprising combining the resultant signal with the reference signal to provide the interference grating signal.

21. The method of claim 20 further including the step, prior to said conditioning step, of amplifying the received signal.

22. The method of claim 21 further including the step, following said combining step, of converting the interference grating signal to digital form.

* * * * *